United States Patent [19]
Sainsbury

[11] 3,977,479
[45] Aug. 31, 1976

[54] GEOLOGICAL EXPLORATION METHOD AND APPARATUS

[75] Inventor: Cleo Sainsbury, Indian Hills, Colo.

[73] Assignee: Airsamplex Corporation, Indian Hills, Colo.

[22] Filed: Jan. 15, 1971

[21] Appl. No.: 106,810

[52] U.S. Cl.............................. 175/58; 175/5; 175/135; 175/405; 73/425.2; 73/432 R; 173/22; 37/183 R; 37/195
[51] Int. Cl.²...................................... E21B 49/00
[58] Field of Search.............. 175/58, 59, 66, 5, 6, 175/402, 405, 403; 244/1, 110, 115, 115.3, 113, 137, 118, 17.7, 24, 18; 33/126, 126.4; 173/27; 37/1; 73/432 R; 23/230 EP; 169/2 A

[56] References Cited
UNITED STATES PATENTS

| | | | |
|---|---|---|---|
| 1,410,904 | 3/1922 | Fitzpatrick | 33/126.4 X |
| 1,770,700 | 7/1930 | Jenkins | 258/1.2 |
| 1,911,431 | 5/1933 | Cawley | 169/2 A |
| 2,402,879 | 6/1946 | Du Pont | 258/1.2 |
| 2,488,486 | 11/1949 | Worzel | 175/403 |
| 2,709,072 | 5/1955 | Hitchcock | 175/403 X |
| 2,717,656 | 9/1955 | Bannister | 175/1 X |
| 2,914,950 | 12/1959 | Giguere | 175/5 X |
| 3,047,080 | 7/1962 | Gunther | 173/27 |
| 3,078,931 | 2/1963 | Moore | 175/5 |
| 3,165,931 | 1/1965 | Shipek | 175/6 |
| 3,248,074 | 4/1966 | Cannon | 169/2 A |
| 3,309,518 | 3/1967 | Weiss | 73/28 X |
| 3,327,968 | 6/1967 | Converse | 244/3 |
| 3,455,395 | 7/1969 | Pomeroy | 116/315 |
| 3,464,504 | 9/1969 | Stange | 175/58 X |
| 3,477,525 | 11/1969 | Farrell et al. | 175/6 |
| 3,602,320 | 8/1971 | Howard | 175/58 |

*Primary Examiner*—Ernest R. Purser
*Assistant Examiner*—Richard E. Favreau
*Attorney, Agent, or Firm*—Roylance, Abrams, Berdo & Kaul

[57] ABSTRACT

A method of obtaining geological specimens is disclosed along with methods of producing a geological or geochemical map and apparatus for accomplishing the method. A fixed wing or other airborne vehicle, such as a light plane or a helicopter, is operated at relatively low absolute altitude over a region of the surface of the earth from which specimens are to be obtained. A sampling device is extended from the vehicle and caused to contact the surface of the earth while the vehicle is maintained airborne. The sampling device is then returned to the vehicle and the sample thus obtained is removed therefrom and the operation is repeated at various selected points in the region. The apparatus includes various sampling devices including tubular bodies having stabilizing fins or the like to direct the bodies at the surface of the earth in a desired manner. Sample holders are contained within or carried by the devices to gain samples of rock, earth, sand, vegetation and other material for rock typing or further analysis, the data thus obtained being enterable on a map or otherwise used to yield information about the geological characteristics of the region under surveillance.

12 Claims, 20 Drawing Figures

U.S. Patent   Aug. 31, 1976   Sheet 1 of 4   3,977,479
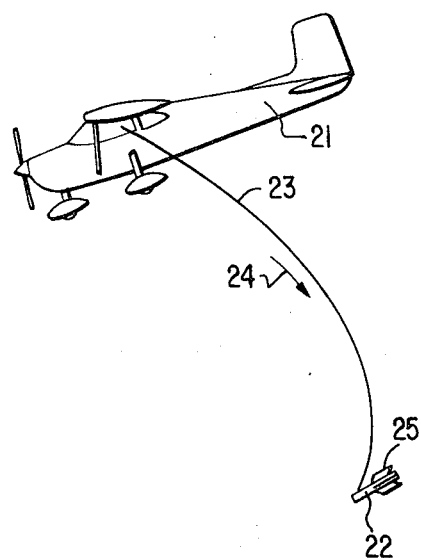
FIG. 1a
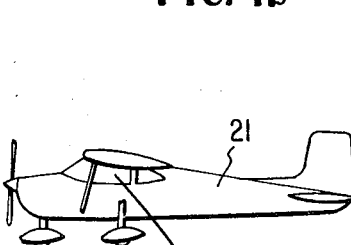
FIG. 1b
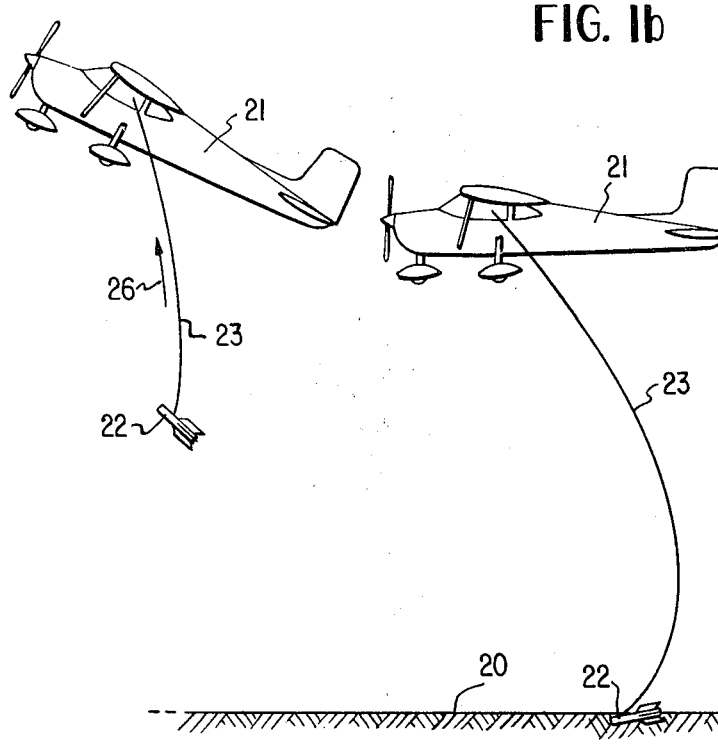
FIG. 1c
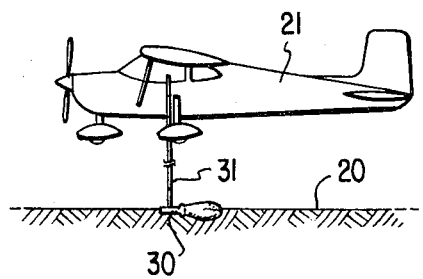
FIG. 2
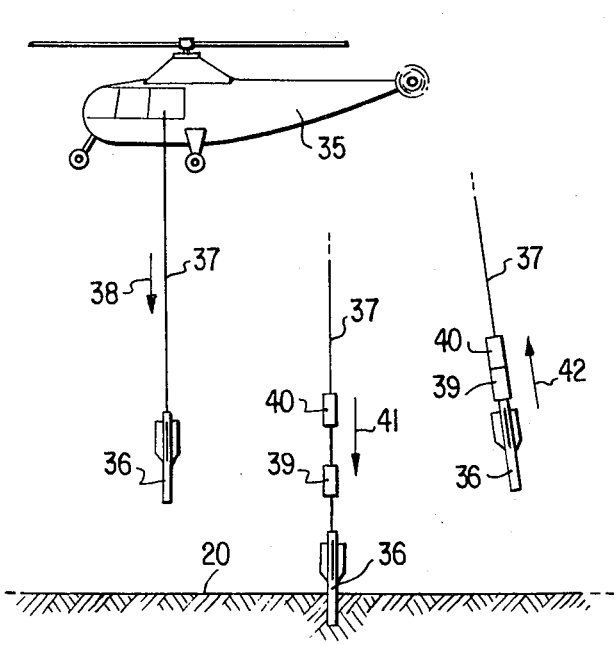
FIG. 3a
FIG. 3b
FIG. 3c
INVENTOR
CLEO LADELL SAINSBURY
BY Roylance, Abrams, Berdo & Kaul
ATTORNEYS.

INVENTOR
CLEO LADELL SAINSBURY

BY Roylance, Abrams, Berdo & Kaul
ATTORNEYS.

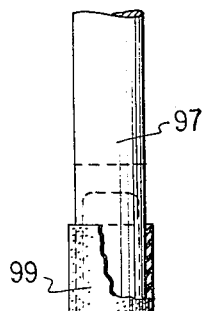
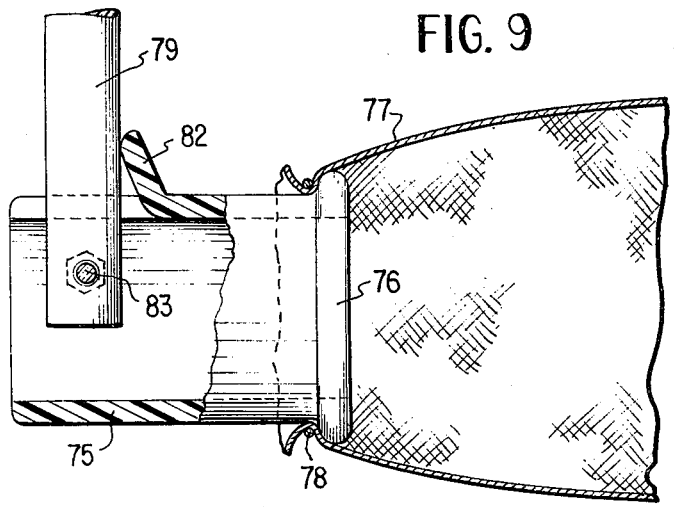
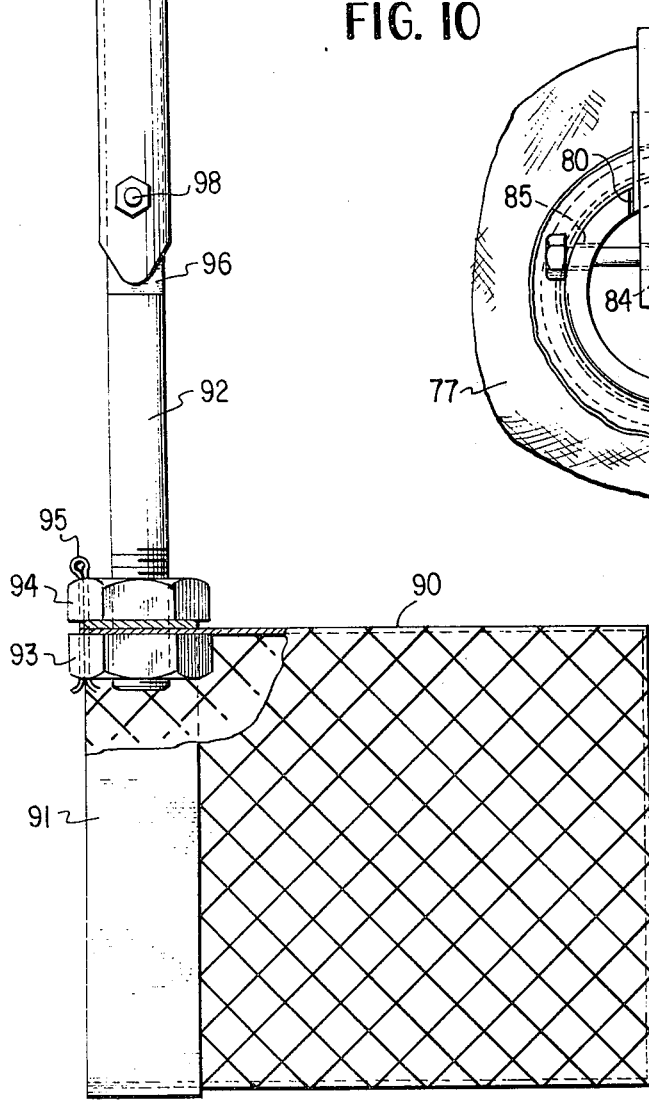
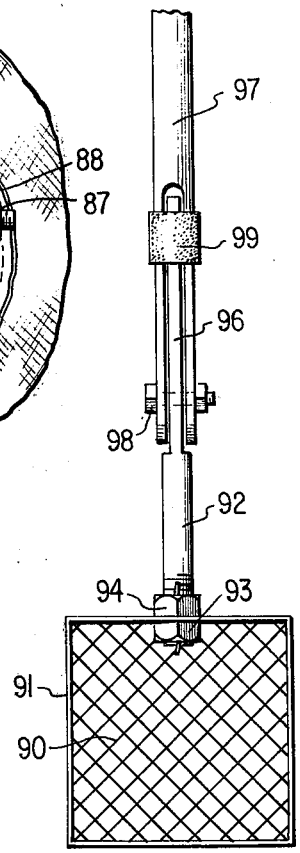

U.S. Patent  Aug. 31, 1976  Sheet 4 of 4  3,977,479
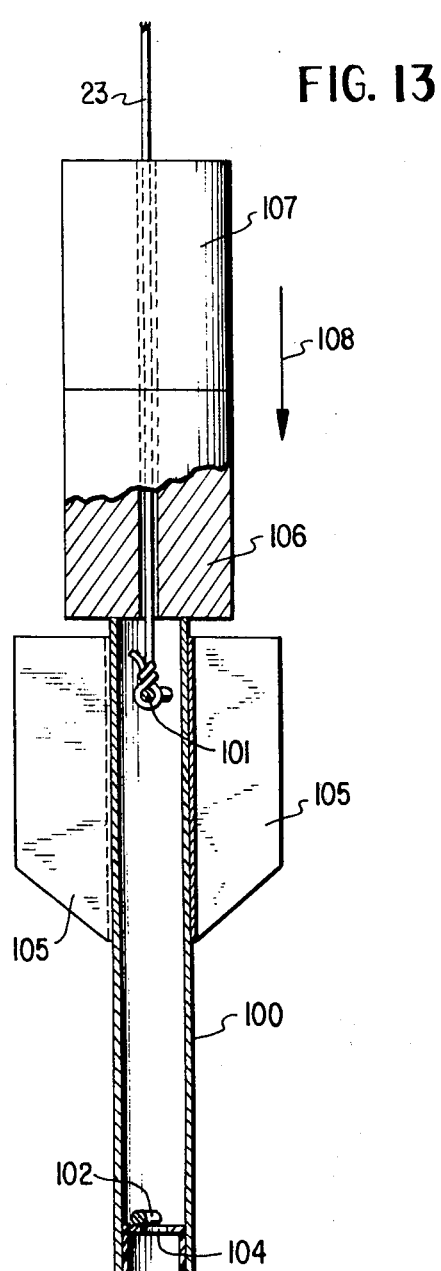
FIG. 13
FIG. 14
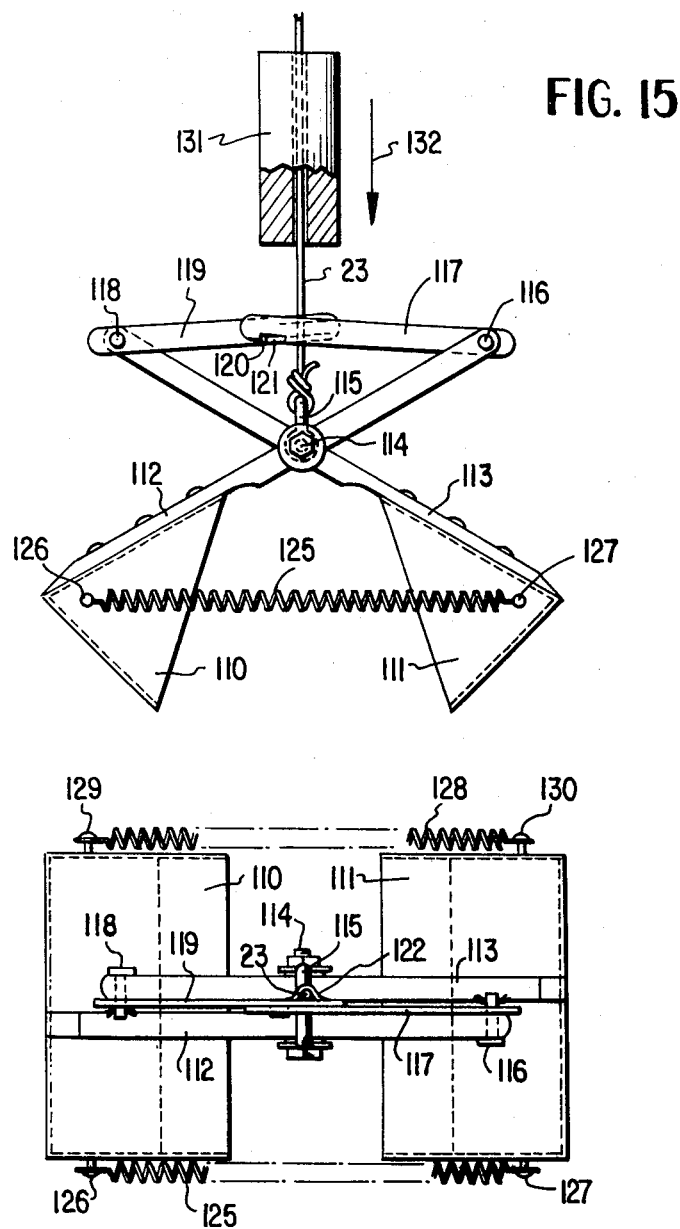
FIG. 15
FIG. 16
INVENTOR
CLEO LADELL SAINSBURY
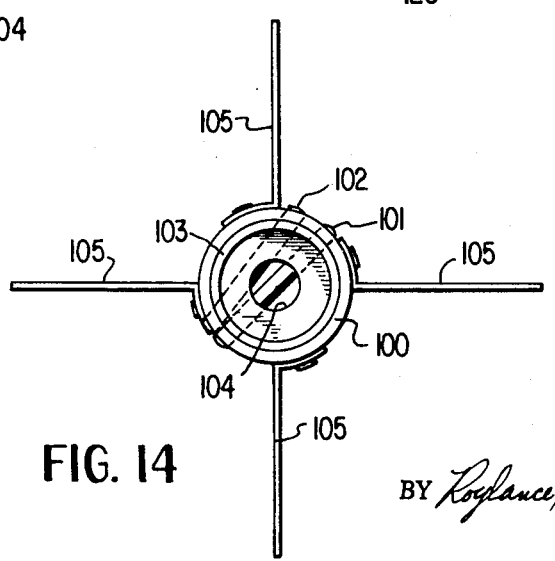
ATTORNEYS

GEOLOGICAL EXPLORATION METHOD AND APPARATUS

This invention relates to a method and apparatus for obtaining geological and geochemical samples from the surface of the earth.

Geological exploration, for various purposes, is a field which has been undertaken for many years for a variety of purposes including prospecting for mineral deposits, mapping for oil or gas resevoirs, or gathering information simply for the more fundamental science of geology. It has historically been the task of the prospector or geologist to wander on foot or by means of land or air transporation from one point to another in the area under study for the purposes of gathering samples, analyzing rock type and studying the chemical characteristics of various samples obtained to obtain the necessary information for whatever purpose. When using air transporatation techniques it has been necessary to land at each sample location.

Clearly, geological exploration by any of the traditional techniques has been a time consuming and increasingly expensive procedure and has changed relatively little over the years, there being many areas which could not heretofore be sampled except after long traverses on foot.

It is an object of the present invention to provide a method of geological or geochemical exploration which is capable of being performed in a substantially shorter time than occupied by previous methods.

A further object is to provide apparatus by which geological samples can be obtained from the surface of the earth from an airborne vehicle.

Yet another object is to provide aerodynamic sample collecting means for collection of samples from a moving airborne fixed wing aircraft.

A still further object is to provide apparatus which is ejectable from a helicopter to contact the surface of the earth, collect samples therefrom, and be returned to the vehicle.

Briefly described, the method of the invention is based on the concept that a sampling device can be extended from an airborne vehicle without landing the vehicle and that samples can be collected with the extended device. Accordingly, one method in accordance with the invention is for the purpose of preparing a geological map of a region of the earth's surface from a topological map of the region including operating an airborne vehicle at a low absolute altitude over the region to be mapped, collecting samples of surface material from at least some selected points in the region while maintaining the vehicle airborne, identifying on the topological map the points from which individual samples were collected, determining the geological or geochemical nature of the individual samples, and entering the information from the geological determinations on the topological map at the points previously identified. In accordance with the above method, the airborne vehicle can be a fixed wing aircraft, a helicopter or other suitable craft. Preferably, the aircraft is operated at an absolute altitude of between 3 and 60 meters.

It will be recognized that the geological data accumulated by the sampling method above described can also be used to provide a tabulation of data, rather than for preparing a map directly, the tabulation being used for other forms of analysis of the characteristics of the earth's surface.

It should also be noted that aerial photographs can be used in place of, or in conjunction with, maps of the area to be examined. Such photographs are especially useful if the area has not been mapped with sufficient accuracy or detail to permit proper location of the points from which specimens are taken, and the term "maps" as used herein should be read to include photographic facsimiles of the area.

Further in accordance with the invention, various apparatus is disclosed for gathering the specimens, including sampling means having sample carriers carried by the sampling means for impinging on and gathering samples of the earth's surface.

In order that the manner in which the foregoing and other objects are attained in accordance with the invention can be understood in detail, particularly advantageous embodiments thereof will be described with reference to the accompanying drawings, which form a part of this specification, and wherein:

FIGS. 1a–c are diagrams of a fixed wing aircraft gathering a sample from the surface of the earth in accordance with the present invention;

FIG. 2 is a diagram of an aircraft collecting a sample with a different form of sample carrier;

FIGS. 3a–c are diagrams of a helicopter collecting samples from the earth's surface in accordance with the invention;

FIG. 9 is a side elevation, in partial section of yet another embodiment of a sampling device in accordance with the invention;

FIG. 10 is a front elevation of the apparatus of FIG. 9;

FIG. 11 is a side elevation, in partial section, of a further sample collecting device in accordance with the present invention;

FIG. 12 is a front elevation of the apparatus of FIG. 9;

FIG. 13 is a vertical section of a sampling device especially useful with a hovering type of airborne vehicle;

FIG. 14 is a bottom view of the apparatus of FIG. 13;

FIG. 15 is a side elevation of an apparatus especially useful for accumulating samples from a hovering vehicle in accordance with the invention; and FIG. 16 is a plan view of the apparatus of FIG. 15.

Figure 4:
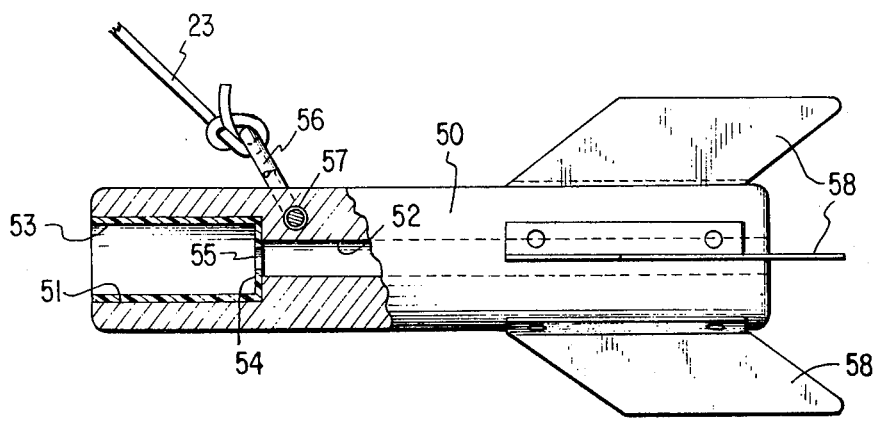
FIG. 4 is a side elevation, in partial section, of a sampling device in accordance with the present invention.

Referring now to the drawings in detail, it will be seen that FIGS. 1a–1c show in sequence, from right to left, three positions which can be occupied by a fixed wing aircraft in collecting a sample in accordance with the method, and utilizing the apparatus, of the invention. It will be assumed that a selected region on the surface of the earth 20 has been selected by a geologist or pilot/-geologist in an aircraft 21 with which the sample is to be collected. The aircraft is then operated in the region over the selected point and caused to approach that point at relatively low absolute altitude, as generally depicted in 1a. As will be recognized by those familiar with flying, the term "absolute altitude" indicates the actual distance between the aircraft and the surface of the earth over which the aircraft is flying, as distinguished from barometric altitude which indicates the distance of the aircraft above sea level. As the aircraft 21 approaches the selected region, a specimen collecting device 22 is lowered from the aircraft by a flexible and shock-absorbing line 23 in the direction indicated by arrow 24. Device 22 is provided with aerodynamic stabilizing and guiding fins 25 which maintain the device pointing in substantially the same direction as the aircraft and which will direct the device so as to cause the desired contact with the surface of the earth.

FIG. 1b depicts the approximate position of the aircraft and the sampling device 22 as the latter comes in contact with, digs into and accumulates a sample of the surface of the earth at the selected region. Means to be described hereinafter is provided on the sampling device to collect a soil, sand or other geological sample upon contact, after which device 22 is again drawn back into the aircraft as shown in FIG. 1c, and as indicated by arrow 26. Depending upon the terrain and other factors, the withdrawing of the sample device can also be accompanied by an increase in the absolute altitude of the aircraft, especially if this is necessary for avoiding obstructions in the area.

Several variables should be mentioned with respect to FIGS. 1a–c, one such variable being the nature of the sampling device. As generally depicted in FIG. 1b, the surface of the earth can be substantially flat, such as a beach area from which sand or loose soil is to be gathered, or a meadow or other region which is free of rocks and underbrush. In this region, a sampling device of the type depicted is quite useful. However, the area could also be of a type wherein the surface is covered with small rocks, gravel, or other materials for which a sampling device of the type shown is quite unsatisfactory. Sampling means suitable for these circumstances will be described hereinafter, but it must be understood that the general operation depicted in FIGS. 1a–c is useful regardless of which of these types of terrain is encountered and which kind of sampling device might replace device 22. For simplicity, these other devices will not be shown in the use depicted in FIGS. 1a–c.

One additional form of sampling device and technique is shown in FIG. 2, in which the aircraft 21 is operated at a low absolute altitude relative to the surface of the earth 20, and wherein a sampling device 30 is extended from the aircraft by means of a stiff but supple elongated support 31. It will be observed that this technique, using a relatively stiff support rather than flexible cable 23 as depicted in FIGS. 1a–c is especially useful with certain forms of sample collecting devices and when collecting samples of relatively loose material such as gravel or sand. The technique for employing the apparatus of FIG. 2 is substantially the same as FIG. 1.

It will be recognized that in using the apparatus of either FIG. 1a–c or FIG. 2, the elongated support, whether flexible or stiff, must be selected so that they are sufficiently strong and resilient to withstand the forces involved in collecting a sample from a moving vehicle, but not so strong as to preclude normal operation of the aircraft should the sampling device or the extendable support become inadvertently engaged with some obstruction on the earth such as a tree, rock or the like.

Yet another approach to the sampling problem is depicted in FIGS. 3a–c wherein a hovering vehicle such as a helicopter 35 is employed. This technique is especially useful for collecting samples in regions where the zone to be sampled is amidst tress, large rocks or underbrush and wherein a sweeping sampling technique such as in FIGS. 1a–c or FIG. 2 cannot safely or conveniently be used or where a helicopter cannot land. In the apparatus in FIG. 3a, the helicopter 35 hovers over the surface of the earth 20 and drops a sample obtaining device 36 on a flexible cable 37 as indicated by arrow 38. Sampling device 36 is provided with an open lower end which comes in contact with the ground and digs into the surface to some extent. After contact with the surface is made one or more weights 39 and 40 can be sequentially lowered by the force of gravity along cable 37 as indicated by arrow 41, each weight being permitted to freely fall along the cable and strike the upper end of sampling device 36, acting as a hammer to drive the sampling device deeper into the soil and causing more sample to be driven into the lower end of the device. After the weights have been lowered and the sample solidly packed into the end of the sampling device, the entire apparatus is withdrawn into the helicopter as indicated by arrow 42, whereupon the sample holder can be removed from the sampler.

In accordance with the method of the invention, after a sample is collected by any one of the techniques so far discussed, the sample collected is taken into the aircraft and can be removed from the sampling device after which the sampling process can be repeated in as many zones within the desired region as possible or as desirable. The number of samples would, of course, depend upon the specific terrain under investigation, the amount of information needed, and other factors dependent upon the judgment of the operator of this method. In producing a geochemical map it will generally be desirable to withdraw the sample in its holder from the sampling device, isolate and identify the sample as to the specific location from which it was taken, thus correlating each sample with a geographic location for later analysis and completion of the map. It may also be desirable, especially in the preparation of a geological map by the methods of the invention, to observe the sample immediately after returning it to the aircraft, make an identification of rock or soil type and characteristics visually, and note this information, no longer retaining the sample, or retaining the sample in some cases for later confirmation or further analysis. However, the specific type of analysis performed or the time at which the analysis is performed is of relatively small importance, the significant feature being the taking of the sample and correlation of its location in a repeated sequence of steps as described above.

The terms "geological samples" and "geochemical samples" as used herein should be understood to include soils, rocks, sands, stream sediments, vegetation, and any other naturally occurring substance from which geological or geochemical information can be derived.

Figure 5:
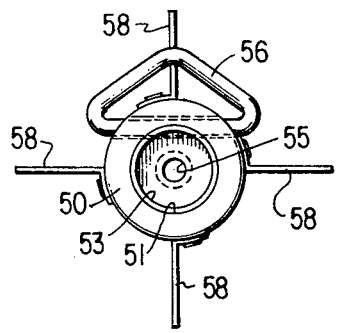
FIG. 5 is a front elevation of the apparatus of FIG. 4.

The remaining figures illustrate specific embodiments of sampling devices usable in the method of, and with the previously discussed apparatus of, the invention. FIGS. 4 and 5 illustrate a sampling apparatus especially useful with a forwardly moving airborne vehicle such as the fixed wing aircraft of FIGS. 1a–c.

The apparatus of FIG. 4 is seen to include a substantially cylindrical elongated body 50 which is preferably made of a metallic material of a type which does not contain trace elements normally found in geological samples of the type to be obtained with the sampling device. For most regions, the device can be formed from a steel alloy which does not include chrome, nickel or molybdenum and the device will then be non-contaminating.

The sample holder or cup, to be described hereinafter, should be free of trace elements being sought in geochemical exploration. Two materials which are especially suitable are polyethylene and spun aluminum.

The body 50 includes an axial recess 51 which extends inwardly from one end of the body and which is advantageously of a right circular cylindrical shape. An axial bore 52 of smaller diameter than the recess extends axially through the remainder of the body and opens at the other end. A sample cup 53, designed to fit snugly within recess 51, also opens to the front of the device and is essentially closed at the other by an end wall 54, except for a small vent hole 55 which communicates with bore 52 for the purpose of permitting air to escape from the sample chamber or cup as a soil sample enters the front of the device.

The device is attached to the suspending cable or cord 23 by a holding or latch ring 56 which is generally triangular in shape with the base of the triangle passing through a transverse opening 57 in body 50. The cable is simply tied or latched by some other convenient device as a halyard snap to ring 56. It will be observed that the ring is pivotable within the opening, and that the opening is disposed forwardly of the axial center of the body so that the body is clearly pulled and there is no tendency for it to tumble under the force exerted through flexible line 23. To provide stability and to maintain the body traveling in the desired direction, the after portion of the body is provided with a plurality of aerodynamic stabilizing fins 58 which are riveted or otherwise suitably fastened to the exterior of the body. Fins 58 can advantageously be made of aluminum.

When the apparatus of FIGS. 4 and 5 is used, the body is suspended from or held within the aircraft and is permitted to drop as it moves generally in the same direction as the aircraft, the forward portion of the body containing the sample cup being directed toward the surface of the earth in the manner of a projectile, the weight of the body causing it to fall under the force of gravity in addition to the generally forward pull exerted by the cable. Thus, when the absolute altitude of the aircraft is sufficiently diminished, and/or the length of cable is sufficiently great, the nose of the projectile strikes the surface of the earth, forcing geological material to enter the sample cup, the air in the cup being vented through opening 55 and bore 52. The pull of the cable or elastic cord then disengages the projectile from the earth's surface, permitting its return to the aircraft, where cup 53 is removed by pushing it with a wooden or plastic rod passed through passage 52.

Figure 6:
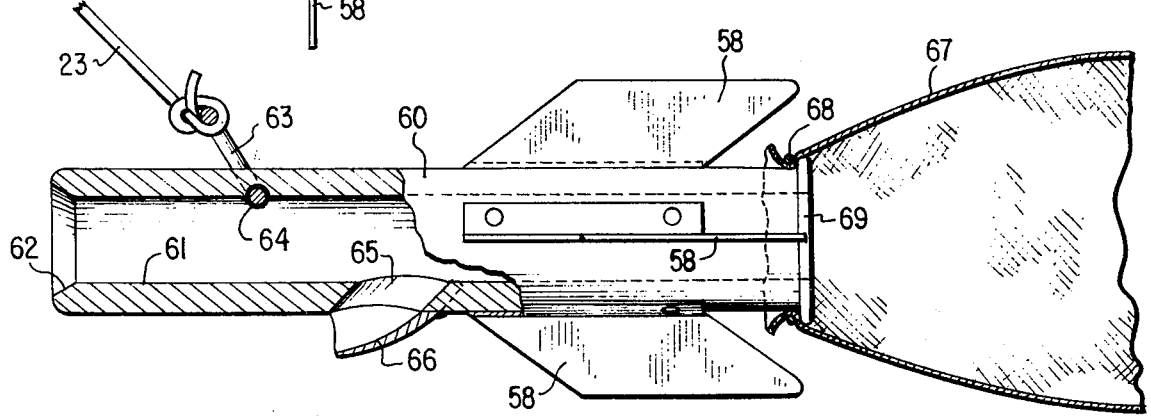
FIG. 6 is a side elevation, in partial section, of a further embodiment of a sampling device in accordance with the present invention.
Figure 7:
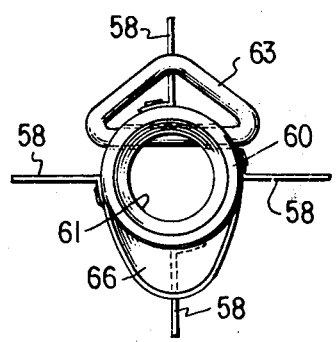
FIG. 7 is a front elevation of the apparatus of FIG. 6.

A further embodiment of a specimen collector is shown in FIGS. 6 and 7, this embodiment including a substantially cylindrical body 60 having a central axially extending bore 61 opening at both ends of the body and extending completely therethrough. At the forward end of the projectile the bore terminates in a chamfered opening 62 forming a slightly funnel-like opening into which material can be forced when the device is caused to contact the surface of the earth in substantially the same manner as described with reference to FIGS. 4 and 5. A ring 63 is again provided, the ring being substantially triangular in shape and passing through an opening 64 in body 60.

An additional feature of the embodiment of FIGS. 6 and 7 includes a lateral opening 65 in the bottom of body 60, the bottom being the side opposite that through which ring 63 is passed. Partially surrounding and extending away from opening 65 is a scoop 66 which protrudes radially outwardly from the exterior surface of the body and is open towards the front of the body so as to receive material and conduct the material into the bore 61 when the body is caused to contact the surface of the earth. Material can clearly be received through either of openings 62 or 65, depending upon the specific angle at which the device strikes the ground and the nature of the ground itself.

The apparatus also includes stabilizing fins 58.

A material receiving bag 67 is provided at the rear of body 60 to receive material which passes entirely through bore 61. The forward end of the bag surrounds the exterior of body 60 and is clamped thereto by an elastic retaining ring 68 which grips the bag immediately forward of an annular radially outwardly extending flange 69 which is formed at the after end of body 60. The bag is preferably a fine mesh capable of retaining the material included in the sample, and sufficiently strong to prevent tearing the bag itself.

The manner of using the device of FIGS. 6 and 7 is substantially the same as for that of FIGS. 4 and 5, the difference being in the nature of the material to be gathered.

Figure 8:
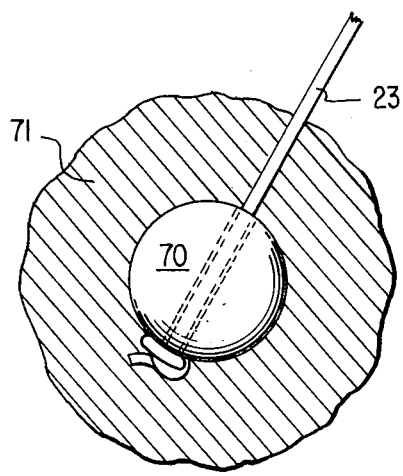
FIG. 8 is a vertical section of yet another embodiment of a sampling device in accordance with the invention.

A device for gathering rocks and relatively large pieces of material, i.e., large compared with the normal granular substance of soil or sand, is shown in FIG. 8. The structure of FIG. 8 includes a substantially spherical metallic ball 70 having a central passage through which cable 23 can be passed and to which it can be secured. The ball is completely surrounded by a mass of a sticky substance 71 to which pebbles, rocks and the like can adhere. A suitable substance is conventional putty, although any material capable of maintaining a form and having a tacky adhesive outer surface is suitable.

In geochemical exploration or sampling, the sticky substance is preferably essentially free of the trace elements of interest to the geologist or geochemist, especially copper, lead, zinc, silver, gold, mercury, beryllium, tin, tungsten, chromium nickel, tantalum, niobium, selenium, tellurium, molybdenum, uranium, thorium, and those other elements commonly known as rare or trace elements and as distinguished from iron, manganese, silicon, aluminum, potassium, sodium and others which occur in notable amounts in the usual geochemical or geological materials. Accordingly, a desirable sticky substance is an organic material not containing significant quantities of inorganic material.

In use, the "sticky ball" of FIG. 8 is simply lowered from the aircraft and allowed to contact the ground at at least one point, permitting it to come in contact with and adhere to small pebbles and the like, after which it can be retrieved and the pebbles, sand or other material can be removed from the surface thereof or examined while still on the sticky surface. Rock fragments are conveniently embedded therein, and can be easily removed. As will be recognized, after several samplings the putty may lose its tacky characteristics, at which time the putty can be removed and a new layer thereof placed on the relatively heavy ball.

FIGS. 9 and 10 show an apparatus which is especially useful for collecting samples from stream sediments, dune and beach sand and other sediment. The apparatus includes a tubular body 75 which is relatively short and can be made of a plastic such as polyethylene. A radially outwardly extending flange 76 is provided at the rear of member 75 to retain a bag 77 somewhat similar to that discussed with reference to FIG. 6. The bag 77 is retained on body 75 by an elastic snap ring 78 which surrounds and grips the open end of the bag immediately forward of flange 76. A notch or recess extends axially in the upper surface of the body 75 from the forward open end thereof to permit attachment to the lower end of a relatively stiff rod 79 which is equivalent to the stiff supporting member 31 discussed with reference to FIG. 2. Two axially extending grooves 80 and 81 are cut beyond the end of the notch, the tab 82 formed by the grooves being bent upwardly at an angle of approximately 45° with respect to the axis of the tube to provide stiffening means to retain the structure in approximately an orthogonal relationship with respect to the rod 79 while the aircraft is in flight. A transverse bolt 83 extends through an opening 84 in rod 79 and through openings 85 and 86 in tube 75. Bolt 83 can be retained in this securing position by a nut 87 which can be prevented from unthreading from the end of the bolt by the insertion of a cotter pin 88 inserted through aligned openings in the bolt and nut for this purpose.

Rod 79 should have characteristics which render it sufficiently stiff and strong to provide force to gather a sample. However, it should be somewhat resilient and supple. It has been found that nylon rod having a diameter of about 19 cm (0.75 inch) works very well for this purpose and provides good shock-absorbing capacity.

In use, rod 79 and similar sections of rod are joined together in the aircraft by threaded couplings of conventional type provided on the ends of such rod, the threaded couplings not being shown in the drawings. When sections have been joined together to form a shaft of suitable length, the apparatus including body 75 is extended downwardly toward the surface of the earth below the level of the aircraft wheels and the aircraft is caused to approach the earth to the point where a sample can be taken, the sample entering the forward end of body 75, passing therethrough, and entering collection bag 77. Upon the acquisition of a sufficient sample, the apparatus is drawn up into the aircraft and the sample bag is removed.

FIGS. 11 and 12 illustrate a device which is especially useful for collecting rock fragments from flat or nearly smooth surfaces, including frost boils, beaches, river bars or glacial outwash or moraine or smooth slopes. The apparatus includes a basket 90 which is generally in the shape of a parallelepiped having one open end, that end being the forward portion of the basket. A reinforcing strap 91 surrounds the edge of the basket adjacent the open end. The basket and reinforcing strap are attached to the threaded end of a rod 92, rod 92 being passed through an opening in one side of the strap and basket and secured thereto by internally threaded nuts 93 and 94 which are threaded onto the end of shaft 92 on the inside and outside of the basket and strap, respectively. The nuts can be prevented from rotating by placing a cotter pin or the like 95 through holes in two nuts and the reinforcing strap which are drilled and aligned for this purpose. For geochemical exploration the strap and basket should be constructed of non-contaminating materials free of the elements described with reference to the "sticky ball" of FIG. 8.

The upper portion of shaft 92, which is a relatively short member, is milled on both sides to form a flat bar 96, this bar being placed between and pivotally connected to the bifurcated lower end of a rod 97. Rod 97 can be regarded as the lower portion of a relatively stiff supporting member such as that discussed with reference to FIGS. 2, 9 and 10. Bar 96 and rod 97 are coupled together for relative pivotal movement by a bolt 98 which is passed through the bifurcated portion of the rod and the flat bar 96 and attached thereto by a nut. An elastic band 99 of rubber or the like surrounds the upper portion of the bifurcated segment of rod 97, providing a shock absorbing element for the basket and rod assembly. As will be recognized, if a force acts against the open side of basket 90 tending to rotate rod 92 and bar 96 in a counterclockwise direction about bolt 98, a limited amount of movement is permitted by extension of the elastic band 99. Band 99 tends to absorb the energy of this force but retains the structure in substantially its original position and returns it thereto as soon as the force is removed.

The device of FIGS. 11 and 12 is operated in a manner similar to the apparatus of FIGS. 9 and 10 wherein threaded rods are added together in flight until the sample device extends a suitable distance below the aircraft. The aircraft is then operated at a sufficiently low altitude and reduced speed until the sampling device can be lowered against the surface, preferably by lowering the entire aircraft, so that the sampling basket encounters loose rocks, pebbles, etc. which are accumulated and retained in basket 90. The aircraft is then caused to climb and the samples in the basket are brought into the aircraft by uncoupling the threaded rods, reversing the process of extending the basket for collection. Again, the samples are removed from the basket, identified as to location from which they were obtained, and the apparatus is ready for reuse.

FIGS. 13 and 14 show a device which was briefly discussed with reference to FIGS. 3a–c and are especially adapted for use with a hovering craft such as a helicopter. As shown in the Figures, the apparatus includes a tubular body 100 having a transverse pin 101 passing through the body near the upper end thereof to which a flexible line 23 can be attached. A second pin 102 passes through the body near the lower end thereof to act as an abutment for the upper end of a sample cup or container 103 which is designed to fit snugly within the lower end of the cylindrical body and having an opening at the lower end thereof to receive geological samples. In a manner similar to the embodiment of FIGS. 4 and 5, the sample cup includes an opening 104 in the upper end thereof to vent air as a sample is introduced into the chamber.

The body is also provided with stabilizing fins 105 to guide its descent. Weights 106 and 107 are provided to drive the device deeper into the ground after initial contact. As previously discussed, the device is lowered or dropped from an aircraft such as a helicopter, the lowering being relatively rapid so that the lower end of the device including the open end of cup 103 and tube 100 penetrate into the surface of the earth. Thereafter, weights 106 and 107 are permitted to freely slide along cable 23 in the direction of arrow 108, each weight acting as a hammer to drive the device deeper into the ground, thereby forcing more sample upwardly into cup 103. The structure is then disengaged from the surface of the earth and withdrawn into the helicopter. It will be recognized that if the device of FIGS. 13 and 14 is sufficiently heavy, and is dropped from sufficient height, or propelled from the aircraft with sufficient initial velocity, the device will penetrate to sufficient depth to secure the desired sample, in most cases, without the use of weights 106 and 107.

Yet another embodiment of a sampling device is shown in FIGS. 15 and 16, this device also being especially suitable for use from a hovering craft such as a helicopter. The apparatus includes a pair of inwardly opening clamshell buckets 110 and 111, bucket 110 being riveted or otherwise suitably attached to an elongated brace member 112, and bucket 111 being riveted or otherwise suitably attached to a similar brace member 113. Braces 112 and 113 are pivotally connected to each other near their midpoints by a bolt 114 which also supports a ring 115 to which a cable 23 is connected for suspension from the vehicle.

The distal end of 112 is pivotally connected by a pin 116 to a link 117. Similarly, the distal end of brace 113 is pivotally connected by a pin 118 to a link 119. Links 117 and 119 extend inwardly toward each other and are sufficiently long to overlap in the vicinity of the cable by which the apparatus is suspended. A notch 120 is provided in the lower surface of link 117 near its distal end, the notch being designed to receive a laterally extending tab 121 which protrudes and is attached to link 119. Link 119 also includes an eye 122 which provides a guide through which cable 23 can pass, and by which cable 23 maintains the apparatus in the orientation shown in FIG. 15.

An extension coil spring 125 is connected between pins 126 and 127 which protrude from the sides of buckets 110 and 111, respectively. A similar extension coil spring 128 is connected between pins 129 and 130 on buckets 110 and 111, respectively, springs 125 and 128 tending to pull the buckets toward each other to a closed, sample-containing position. However, protrusion 121 on link 119, when it is in engagement with notch 120 on link 117, prevents those links from overlapping to any greater degree than shown in FIG. 15, and the restraint imposed by protrusion 121 on link 117 prevents the links from passing upwardly to disengage the lateral protrusion from the notch. Thus, the apparatus is held in the position shown in FIG. 15 and is lowered from the helicopter in that condition. After the device has reached and is resting on the surface from which a sample is to be taken, a weight 131 is allowed to fall freely along cable 23, as indicated by arrow 132, until it strikes links 117 and 119. When the weight strikes the links the protrusion is disengaged from notch 120, permitting the to swival about pins 116 and 118 and permitting buckets 110 and 111 to come together under the force of the extension coil springs, thereby trapping a sample therebetween.

While certain advantageous embodiments have been chosen to illustrate the invention it will be understood by those skilled in the art that various changes and modifications can be made therein without departing from the scope of the invention as defined in the appended claims.

What is claimed is:

1. A method of accumulating useful geological data on a selected region of the earth's surface comprising the steps of:
    operating a fixed-wing conventional aircraft at low absolute altitude over the selected region,
    collecting a sample of solid surface material from a selected point on the surface of the region from the aircraft while maintaining the aircraft airborne and while operating the aircraft along a path substantially parallel to the surface of the earth,
    geographically identifying the location from which the sample was collected,
    determining the geological nature of the sample,
    correlating the characteristics of the sample with the location from which it was taken; and
    repeating the steps of collecting, geographically identifying, determining, and correlating at other selected points in the region.

2. A method according to claim 1 wherein said aircraft is operated primarily between absolute altitudes of about 3 and about 60 meters during sample collection.

3. An apparatus for collecting geological specimens from the surface of the earth comprising the combination of:
    sampling means for contacting the surface of the earth and for acquiring a geological specimen of solid surface material from the surface at the point of contact,
    a fixed-wing conventional aircraft from which said sampling means can be extended, means for extending said sampling means from said vehicle, for causing said sampling means to contact the surface of the earth, and for returning said sampling means to said vehicle, said means comprising
    a stiff and supple elongated support extendable from said vehicle with said sampling means.

4. An apparatus according to claim 3 wherein said sampling means comprises:
    a basket having an open end substantially lying in a plane which is parallel to the plane including said elongated support and
    means for fastening said basket to said elongated support.

5. An apparatus according to claim 3 wherein said sampling means comprises:
    a rigid cylindrical body having an axially extending passage therethrough,
        one end of said passage being exposed to contact and receive specimen material, and
    a specimen storing container at the other end of said passage, whereby specimen material can pass through said passage to said container and
    means for connecting said rigid cylindrical body to said elongated support.

6. An apparatus for collecting geological specimens from the surface of the earth comprising the combination of:
    sampling means for contacting the surface of the earth and for acquiring a geological specimen from the surface at the point of contact,
    an airborne vehicle from which said sampling means can be extended, and
    means comprising a flexible line for extending said sample means from said vehicle, for causing said sample means to contact the surface of the earth, and for returning said sample means to said vehicle;

said sampling means comprising a weighted structure, an adhesive coating on the exterior of said structure, and means for attaching said weighted structure to said flexible line.

7. An apparatus according to claim 6 wherein: said airborne vehicle is a helicopter.

8. An apparatus for collecting geological specimens from the surface of the earth comprising the combination of:
sampling means for contacting the surface of the earth and for acquiring a geological specimen from the surface at the point of contact,
an airborne vehicle from which said sampling means can be extended, and
means comprising a flexible line for extending said sample means from said vehicle, for causing said sample means to contact the surface of the earth, and for returning said sample means to said vehicle;
said sampling means comprising a rigid cylindrical body with a passage extending axially at least part way through said cylindrical body,
aerodynamic stabilizing fins for maintaining said axially extending passage facing generally in the same direction as the flight of the airborne vehicle,
a specimen container generally of a shape to be inserted into said axially extending passage with one end of said specimen container being exposed to contact and receive specimen material from the surface of the earth and
means for fastening said flexible line to a location on said rigid cylindrical body to achieve balance with aerodynamic stability.

9. An apparatus for collecting geological specimens from the surface of the earth comprising the combination of:
sampling means for contacting the surface of the earth and for acquiring a geological specimen from the surface at the point of contact,
an airborne vehicle from which said sampling means can be extended, and
means comprising a flexible line for extending said sample means from said vehicle, for causing said sample means to contact the surface of the earth, and for returning said sample means to said vehicle.
said sampling means comprising a rigid cylindrical body having an axially extending passage therethrough, one end of said passage being exposed to contact and receive specimen material,
a specimen storing container at the other end of said passage whereby specimen material can pass through said passage to said container,
aerodynamic stabilizing fins for maintaining the opening of said axially extending passage facing generally in the same direction as the direction of flight of the airborne vehicle,
means for fastening said flexible line to a location on said body to achieve balance with aerodynamic stability,
a scoop extending generally downwardly from said body, said scoop being exposed to contact and receive specimen material and
an opening from said scoop to said passageway to facilitate flow of specimen material from said scoop to said specimen storing container.

10. An apparatus for collecting geological specimens from the surface of the earth comprising the combination of:
Sampling means for contacting the surface of the earth for acquiring a geological specimen from the surface at the point of contact;
a helicopter from which said sampling means can be extended, and
means comprising a flexible line for extending said sampling means from said helicopter, for causing said sampling means to contact the surface of the earth, and for returning said sampling means to said helicopter, and wherein
said sampling means includes
a rigid cylindrical body with a passage extending axially at least part way through said cylindrical body, said passage terminating with an opening at one end of said body,
aerodynamic stabilizing fins attached to the other end of said cylindrical body for maintaining the opening facing toward the surface of the earth
a specimen container generally of a shape to be inserted into and supported by the walls of said axially extending passage
the open end of said specimen container being exposed to contact and receive specimen material from surface of the earth, and
means for fastening said flexible line to said other end of said cylindrical body.

11. An apparatus according to claim 10 and further comprising a weight having axial passageway to receive said flexible line,
said weight being dischargable from said helicopter at some time after said cylindrical body and specimen container has contacted the surface of the earth
whereby said weight falling under the influence of gravity is guided toward said specimen container by means of said flexible line and drives said specimen container deeper into the surface of the earth.

12. An apparatus for collecting geological specimens from the surface of the earth comprising the combination of:
sampling means for contacting the surface of the earth and for acquiring a geological specimen from the surface at the point of contact;
a helicopter from which said sampling means can be extended, and
means comprising a flexible line for extending said sample means from said vehicle, for causing said sample means to contact the surface of the earth, and for returning said sample means to said vehicle, and wherein
said sampling means includes
a pair of clamshell buckets;
means for maintaining said buckets in spaced relation and opening toward each other, and for connecting said buckets to said flexible line; and
means for moving the buckets toward each other to enclose a sample; and
means to permit movement of said buckets toward each other after said buckets are in position to enclose a sample.

* * * * *